(12) United States Patent
Maier et al.

(10) Patent No.: US 12,187,182 B2
(45) Date of Patent: Jan. 7, 2025

(54) ILLUMINATION DEVICE FOR A MOTOR VEHICLE HEADLAMP

(71) Applicant: ZKW Group GmbH, Wieselburg (AT)

(72) Inventors: Andreas Maier, Loosdorf (AT); Matthias Kern, Prinzersdorf (AT); Rene Poschenreither, Melk (AT); Lars Amundsson, St. Valentin (AT); Daniel Gaiswinkler, Roggendorf (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/575,521

(22) PCT Filed: Jun. 7, 2022

(86) PCT No.: PCT/EP2022/065353
§ 371 (c)(1),
(2) Date: Dec. 29, 2023

(87) PCT Pub. No.: WO2023/274665
PCT Pub. Date: Jan. 5, 2023

(65) Prior Publication Data
US 2024/0308413 A1      Sep. 19, 2024

(30) Foreign Application Priority Data
Jul. 1, 2021   (EP) .................................... 21183063

(51) Int. Cl.
*B60Q 1/05*    (2006.01)
*B60Q 1/00*    (2006.01)
(Continued)

(52) U.S. Cl.
CPC ............. *B60Q 1/05* (2013.01); *B60Q 1/0058* (2013.01); *B60Q 1/2692* (2013.01); *F21S 41/24* (2018.01);
(Continued)

(58) Field of Classification Search
CPC ...... B60Q 1/05; B60Q 1/0058; B60Q 1/2692; B60Q 2400/30; F21S 41/24; F21S 41/635
See application file for complete search history.

(56) References Cited

U.S. PATENT DOCUMENTS 8,690,401 B2 *   4/2014   Bakacha ................. B60Q 1/05
                                                                 362/464
10,859,228 B2   12/2020   Lim et al.
(Continued)

FOREIGN PATENT DOCUMENTS

JP          2012035778 A   *   2/2012

OTHER PUBLICATIONS

Odagiri K, "Lighting Fixture for Vehicle", Feb. 23, 2012, English text of JP 2012035778 A. (Year: 2012).*
(Continued)

*Primary Examiner* — Alan B Cariaso
(74) *Attorney, Agent, or Firm* — Eversheds Sutherland (US) LLP

(57) ABSTRACT

Illumination device (10) for a motor vehicle headlamp, wherein the illumination device (10) comprising: at least one light module (20) configured to illuminate light along a light path in a main direction (X),—a movable lower light guide element (100) and a movable upper light guide element (200),—a motion device for a movement of the lower and upper light guide element (100, 200) with respect to each other between—a closed position (PI), wherein the lower and upper light guide element (100, 200) are—as seen in the main direction (X)—in front of the at least one light module (20) at least partially blocking the light path of the at least one light module (20), wherein the lower and upper light guide element (100, 200) are configured to emit light in the main direction (X), when in the closed position (PI), and an opened position (P2), wherein the lower and upper light guide element (100, 200) are moved away from the light (Continued)

Figure 1:
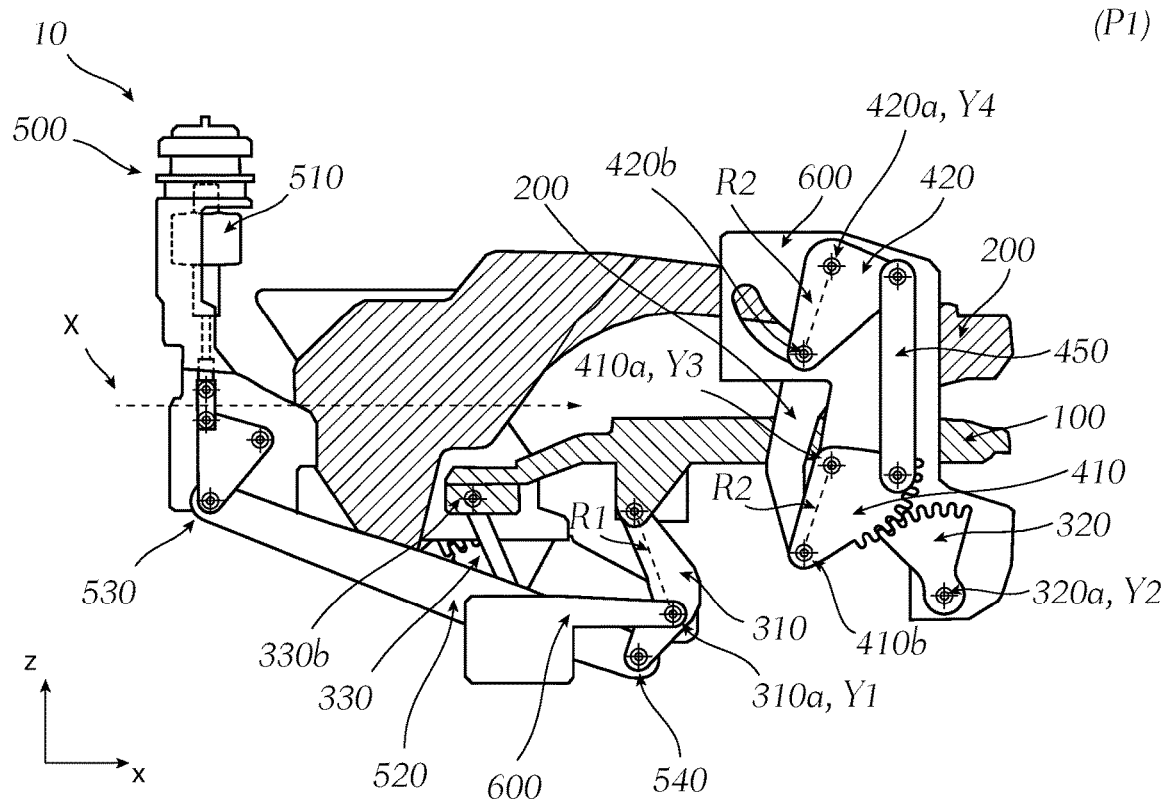

path of the at least one light module to unblock the light path of the at least one light module (20), while maintaining their spatial orientation,—a frame (600), which is stationary in relation to the movement of the lower and upper light guide element (100, 200), wherein the motion mechanism is mounted on the frame (600).

9 Claims, 4 Drawing Sheets

(51) Int. Cl.
    *B60Q 1/26*     (2006.01)
    *F21S 41/24*     (2018.01)
    *F21S 41/63*     (2018.01)

(52) U.S. Cl.
    CPC ........ *F21S 41/635* (2018.01); *B60Q 2400/30* (2013.01)

(56) References Cited

U.S. PATENT DOCUMENTS

| | | |
|---|---|---|
| 2020/0173622 A1 | 6/2020 | Fritzon et al. |
| 2023/0025545 A1 | 1/2023 | Syre et al. |

OTHER PUBLICATIONS

Search Report and Written Opinion for International Patent Application No. PCT/EP2022/065353, dated Sep. 19, 2022 (12 Pages).

\* cited by examiner (P2)

(P2)

ILLUMINATION DEVICE FOR A MOTOR VEHICLE HEADLAMP

The invention relates to an illumination device for a motor vehicle headlamp, wherein the illumination device comprising:
- at least one light module configured to illuminate light along a light path in a main direction,
- a movable upper light guide element and a movable lower light guide element,
- a transition device for transitioning the upper and lower light guide element with respect to each other between
  - a closed position, wherein the upper and lower light guide element are—as seen in the main direction—in front of the at least one light module at least partially blocking the light path of the at least one light module, wherein the upper and lower light guide element are configured to emit light in the main direction, when in the closed position, and
  - an opened position, wherein the upper and lower light guide element are moved away from the light path of the at least one light module to unblock the light path of the at least one light module,
  while maintaining their spatial orientation,
- a frame, which is stationary in relation to the transitioning of the upper and lower light guide element, wherein the transition mechanism is mounted on the frame.

The invention also relates to a motor vehicle headlamp comprising at least one illumination device according to the invention.

In the state of the art, illumination devices comprises transition mechanisms that are often unstable and require a lot of space in a motor vehicle headlamp.

It is an object of the invention to provide an enhanced illumination device.

To achieve this object, the motion device comprises:
- a lower motion mechanism for a movement of the lower light guide element between the closed and opened position, said lower motion mechanism comprises:
  - a first lower motion element with at least two bearing points, wherein the first lower motion element is pivotably connected to the frame via a fixed bearing point and pivotably connected to the lower light guide element via a floating bearing point, wherein the floating bearing point has a distance to the fixed bearing point on the first lower motion element and is movable along a circular path around a first rotation axis determined by the fixed bearing point with a determined radius given by the distance between the floating bearing point to the fixed bearing point, and
  - a second lower motion element with at least two bearing points, wherein the second lower motion element is pivotably connected to the frame via a fixed bearing point and pivotably connected to the lower light guide element via a floating bearing point, wherein the floating bearing point has a distance to the fixed bearing point on the second lower motion element and is movable along a circular path around a second rotation axis determined by the fixed bearing point with a determined radius given by the distance between the floating bearing point to the fixed bearing point,
  wherein the first and second rotation axis are orthogonal to the main direction and are parallel to each other, wherein distance of the floating bearing point and the fixed bearing point of the first and second lower motion element is the same, and wherein the circular paths of the first and second lower motion elements are spatially separated, but are identical, so that the first and second lower motion element have the same deflection, and wherein the floating bearing points of the first and second lower motion element are arranged and movable above the respective fixed bearing points viewed in an installed state of the illumination device in a motor vehicle,
  wherein the first lower motion element is mechanically engaged with a drive device configured to move the first lower motion element, and wherein the first and second lower motion elements are connected via the lower light guide element in a way, so that the first and second lower motion elements are movable by the same deflection about their respective fixed bearing point when the first lower motion element is moved by the drive device,
  and wherein the first and second lower motion element are movable between a first deflection and a second deflection, causing the movement of the lower light guide element between the closed and opened position, while the lower light guide element maintaining its spatial orientation due to the same radius and deflection of the first and second lower motion elements, wherein the lower light guide element is in the closed position, when the first and second lower motion elements are aligned in the first deflection, and wherein the lower light guide element is in the opened position, when the first and second lower motion element are aligned in the second deflection,
- an upper motion mechanism to movement of the upper light guide element between the closed and opened position, said upper motion mechanism comprises:
  - a first upper motion element with at least two bearing points, wherein the first upper transition element is pivotably connected to the frame via a fixed bearing point and pivotably connected to the upper light guide element via a floating bearing point, wherein the floating bearing point has a distance to the fixed bearing point on the first upper motion element and is movable along a circular path around a third rotation axis determined by the fixed bearing point with a determined radius given by the distance between the floating bearing point to the fixed bearing point, and
  - a second upper motion element with at least two bearing points, wherein the second upper motion element is pivotably connected to the frame via a fixed bearing point and pivotably connected to the upper light guide element via a floating bearing point, wherein the floating bearing point has a distance to the fixed bearing point on the second upper motion element and is movable along a circular path around a fourth rotation axis determined by the fixed bearing point with a determined radius given by the distance between the floating bearing point to the fixed bearing point, and
  wherein the third and fourth rotation axis are parallel to each other and to the first and second rotation axis, wherein the first and second upper motion element having the same radius, and wherein the circular paths of the first and second upper motion elements are spatially separated, but are congruent, so that the first and second upper motion element have the same deflection, and wherein the floating bearing points of the first and second upper motion element are arranged and movable below the respective fixed bearing points viewed in an installed state of the illumination device in a motor vehicle, wherein the first upper motion element is mechanically engaged with the second lower motion element in a first transmission connection in a way, so that a rotational movement of the second lower motion element around its fixed bearing point is transformed into a rotational movement of the first upper motion element around its fixed bearing point with an opposite rotational direction, wherein the first and second upper motion element are connected via the upper light guide element in a way, so that the first and second upper motion element are movable by the same deflection about their respective fixed bearing point when the first upper motion element is moved by the second lower motion element, and wherein the first and second upper motion element are movable between a third deflection and a fourth deflection, causing the motion of the upper light guide element between the closed and opened position, while the upper light guide element maintaining its spatial orientation due to the same radius and deflection of the first and second upper motion elements, wherein the upper light guide element is in the closed position, when the first and second upper motion elements are aligned in the third deflection, and wherein the upper light guide element is in the opened position, when the first and second upper motion element are aligned in the fourth deflection, and wherein the lower motion mechanism comprises a third lower motion element with at least two bearing points, wherein the third lower motion element is pivotably connected to the frame via a fixed bearing point and pivotably connected to the lower light guide element via a floating bearing point, wherein the floating bearing point has a distance to the fixed bearing point on the third lower motion element and is movable along a circular path around a fifth rotation axis determined by the fixed bearing point with a determined radius given by the distance between the floating bearing point to the fixed bearing point, and wherein the upper motion mechanism comprises a third upper motion element with at least two bearing points, wherein the third upper motion element is pivotably connected to the frame via a fixed bearing point and pivotably connected to the upper light guide element via a floating bearing point, wherein the floating bearing point has a distance to the fixed bearing point on the third upper motion element and is movable along a circular path around a sixth rotation axis determined by the fixed bearing point with a determined radius given by the distance between the floating bearing point to the fixed bearing point, wherein the third upper motion element is mechanically engaged with the third lower motion element in a second transmission connection in a way, so that a rotational movement of the third lower motion element around its fixed bearing point is transformed into a rotational movement of the third upper motion element around its fixed bearing point with an opposite rotational direction, and wherein the illumination device has—viewed in the main direction and in an installed state of the illumination device in a motor vehicle—two opposite lateral sides, wherein on each lateral side only one transmission connection is disposed.

Thus, the lower and upper motion mechanism causes that the lower and upper light guide elements, when transition from the opened position to closed position follow a movement where the light guide elements move simultaneously to each other and against the main direction. Thus, seen in a side view of the illumination device the light guide elements perform a movement along a circular path.

With this motion device the illumination device requires a more stable mechanism and much less space in a motor vehicle headlamp, especially in regard with the transition movements of the lower and upper light guide element when transition from the opened position to the closed position and vice versa. Thus, offers more design option and/or additional light modules.

Advantageously, the lower and upper light guide elements are built as light guide elements with a longitudinal axis, wherein the light guides are arranged in a way, that their longitudinal axis is orthogonal to the main direction of the illumination device.

Advantageously, the lower and upper light guide elements are configured to illuminate a daytime running light when in the closed position.

Advantageously, the lower and upper light guide elements do not illuminate light when in the opened position.

Advantageously, the third upper motion element and the third lower motion element are built as gear wheels that are mechanically engaged with each other in order to transmit the movement of the third lower motion element to the third upper motion element.

Advantageously, the second lower motion element and the first upper motion element are built as gear wheels that are mechanically engaged with each other in order to transmit the movement of the second lower motion element to the first upper motion element.

Advantageously, the drive device is a linear driving device.

Advantageously, the drive device comprises a motor and a driving lever, wherein the driving lever is mechanically connected to the motor via a bearing point and mechanically connected to the first lower motion element via a bearing point, wherein the driving lever is driven by the motor in a way, so that the driving lever causes a movement of the floating bearing point of the first lower motion element on the circular path around the first rotation axis.

Advantageously, the first and second upper motion elements are further connected via a rod, wherein the rod comprises a bearing point pivotably connected to the first upper motion element and a bearing point pivotably connected to the second upper motion element, wherein the rod is configured to guide the second upper motion element in its movement between the third and fourth deflection, when the first upper motion element is moved by the second lower motion element.

Advantageously, the upper motion mechanism comprises a fourth upper motion element with at least two bearing points, wherein the fourth upper motion element is pivotably connected to the frame via a fixed bearing point and pivotably connected to the upper light guide element via a floating bearing point, wherein the floating bearing point has a distance to the fixed bearing point on the fourth upper motion element and is movable along a circular path around a seventh rotation axis determined by the fixed bearing point with a determined radius given by the distance between the floating bearing point to the fixed bearing point, wherein the seventh rotation axis is parallel to the sixth rotation axis, and wherein the third and fourth upper motion element having the same radius, and wherein the circular paths of the third and fourth upper motion elements are spatially separated, but are congruent, so that the third and fourth upper motion element have the same deflection, and wherein the floating bearing points of the third and fourth upper motion element are arranged and movable below the respective fixed bearing points viewed in an installed position state of the illumination device in a motor vehicle, and wherein the third and fourth upper motion elements are further connected via a rod, wherein the rod comprises a bearing point pivotably connected to the third upper motion element and a bearing point pivotably connected to the fourth upper motion element, wherein the rod is configured to guide the fourth upper motion element in its movement between the third and fourth deflection, when the third upper motion element is moved by the third lower motion element.

Advantageously, the illumination device comprises a fail-safe-mechanism for manually move the upper and lower light guide element into the opened position, wherein the fail-safe-mechanism comprises:
- a transmission element comprising a thread portion extending along a thread axis, said transmission element is rotatably mounted on the frame around the thread axis,
- a drive device holder holding the drive device, wherein the drive device holder comprises a counter-thread portion corresponding to the thread portion of the transmission element, wherein the drive device holder is in mechanical engagement with the transmission element by means of the counter-thread portion and the thread portion, wherein the drive device holder with the counter-thread portion in combination with the thread portion of the transmission element, in order to translate a rotational movement of the transmission element into a linear movement, is configured to convert an angular movement of the transmission element into a linear movement of the drive device along the thread axis, wherein the linear movement of the drive device moves the first lower motion element in order to move the lower and upper light guide element into the opened position.

The object can also be achieved by a motor vehicle headlamp comprising at least one illumination device according to the invention.

Figure 2:
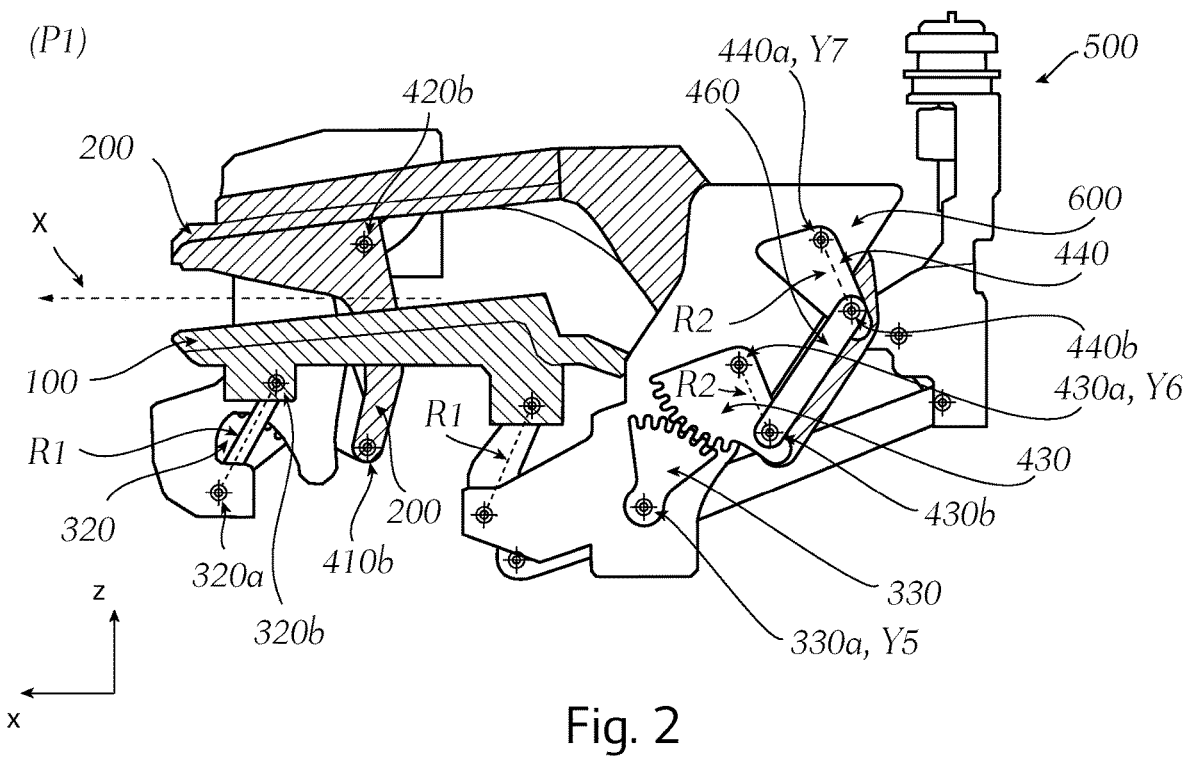
Figure 3:
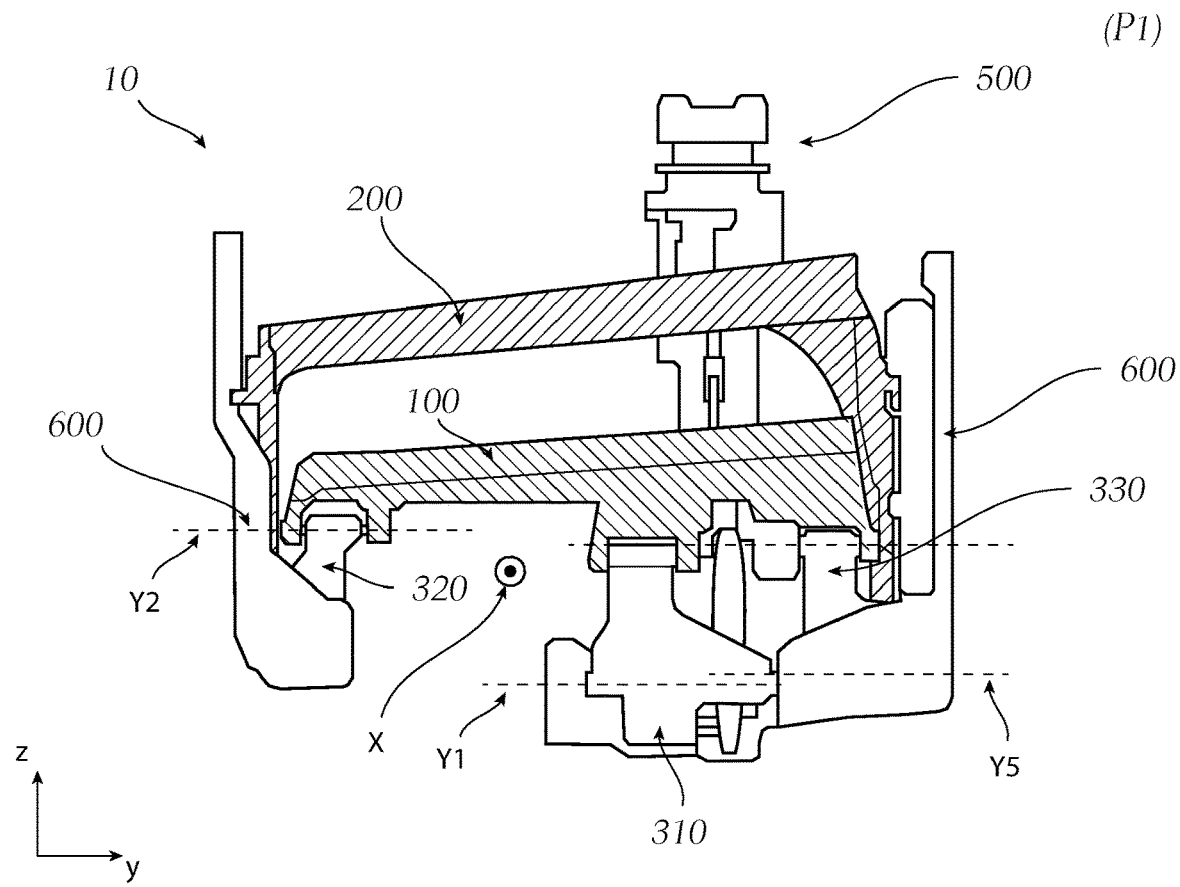
Figure 4:
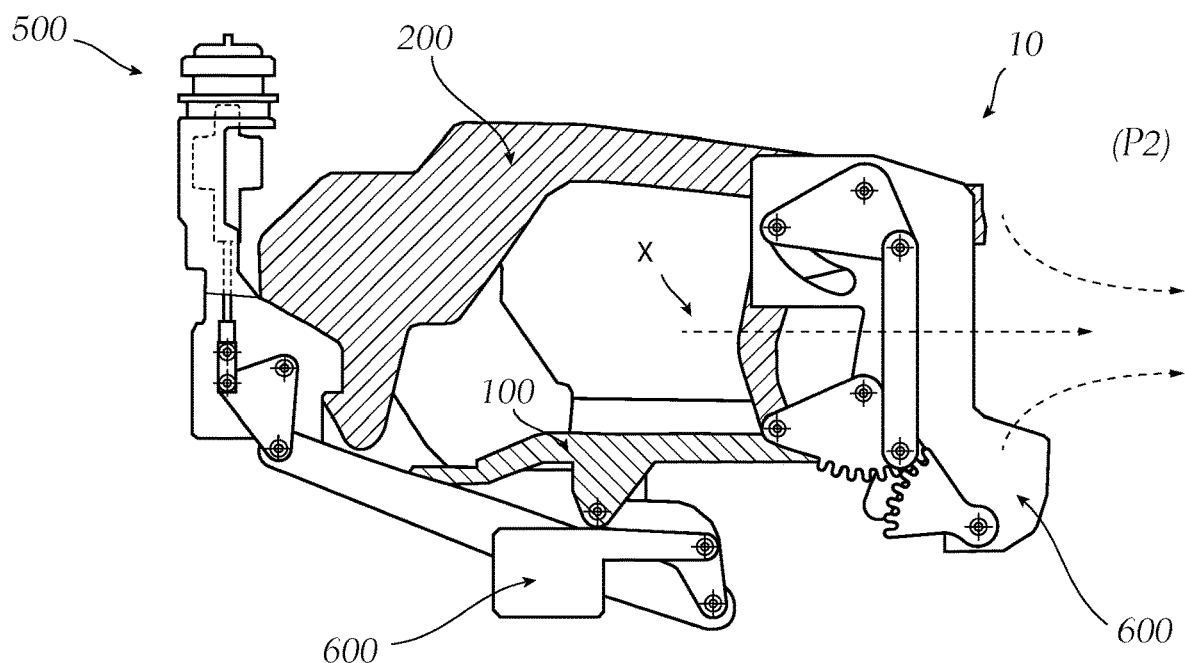
Figure 5:
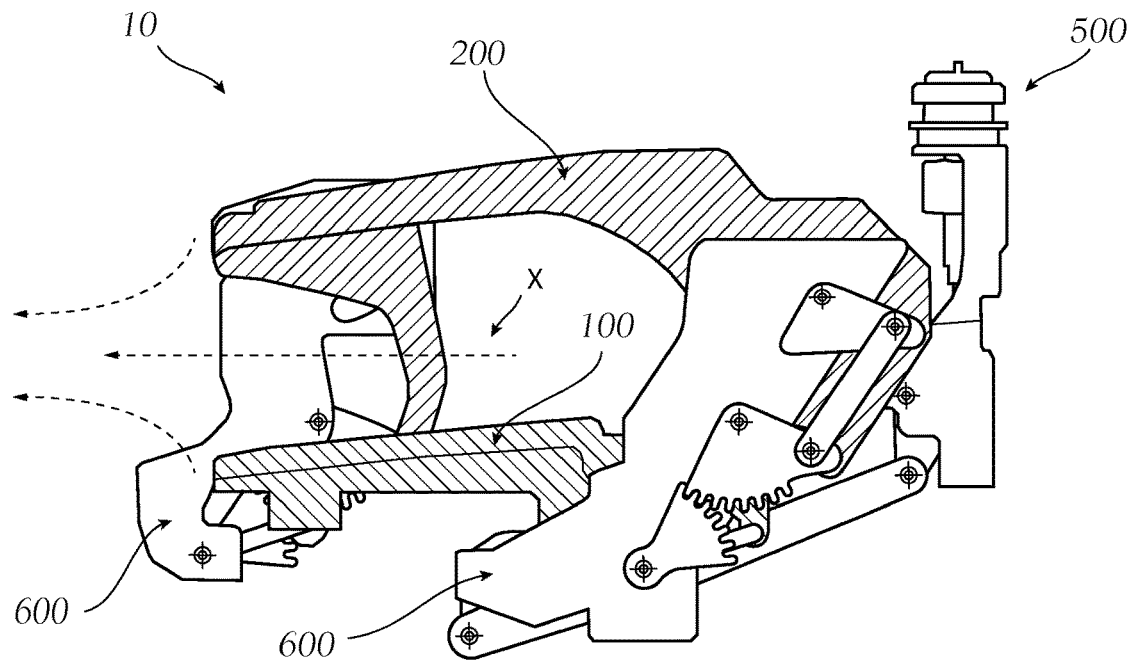
Figure 6:
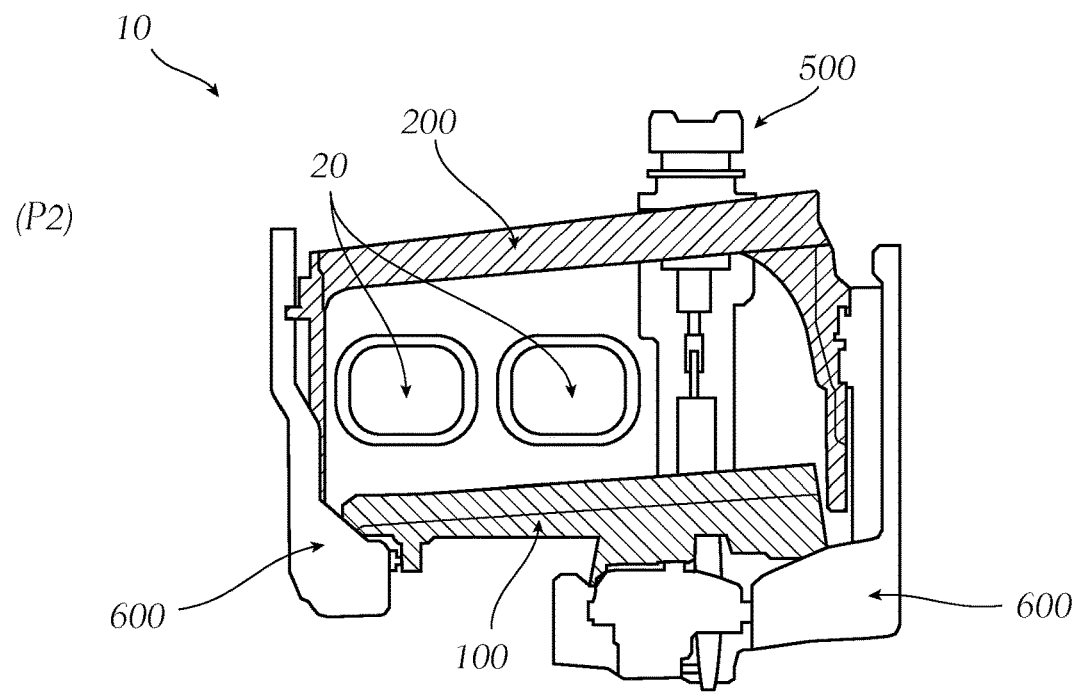
Figure 7:
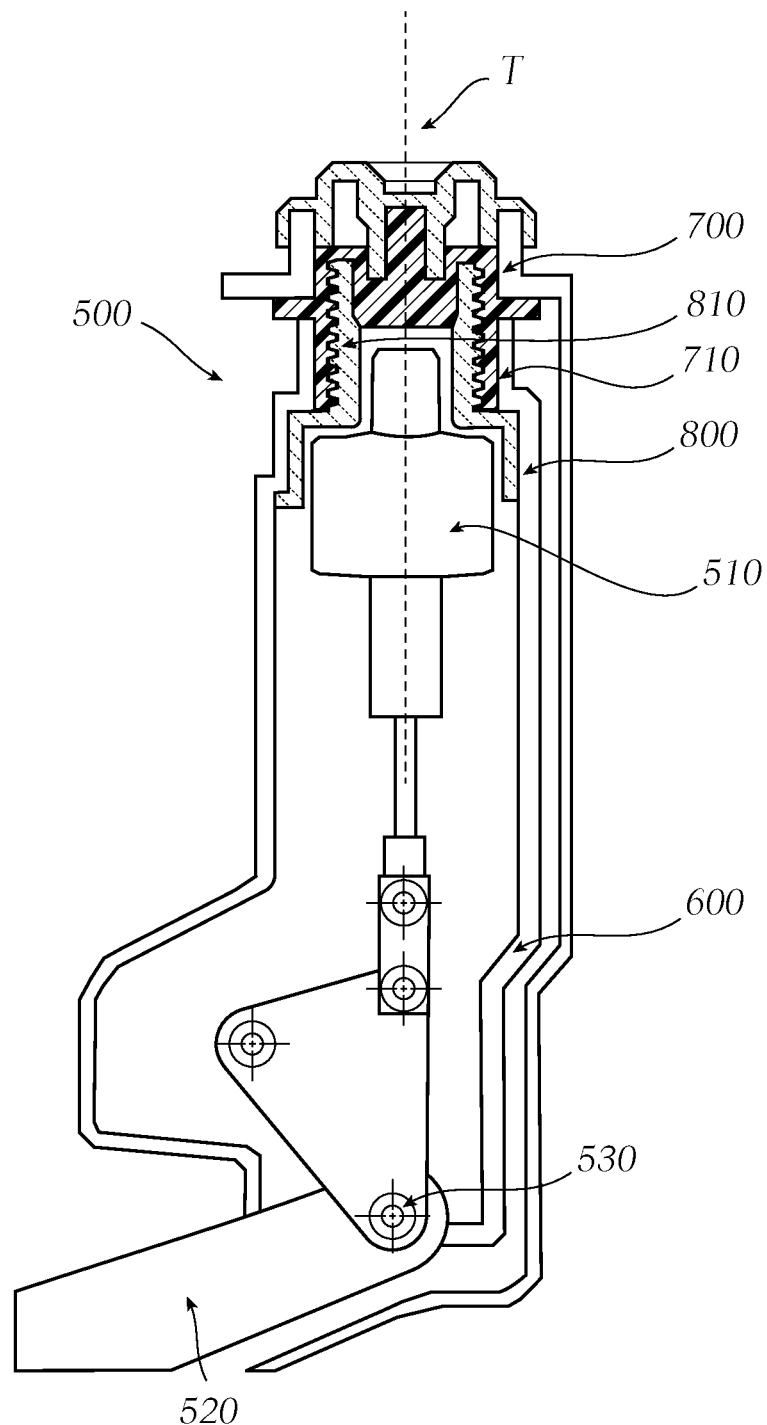

In the following, in order to further demonstrate the present invention, illustrative and non-restrictive embodiments are discussed, as shown in the drawings, which show:

FIG. 1 a side view of an example of an illumination device according to the invention in a closed position, FIG. 2 a view from the opposite side of the illumination device in FIG. 1 in a closed position, FIG. 3 a front view of the illumination device in FIG. 1 in a closed position, FIG. 4 corresponds to the illumination device and view of FIG. 1 in an opened position, FIG. 5 corresponds to the illumination device and view of FIG. 2 in an opened position, FIG. 6 corresponds to the illumination device and view of FIG. 3 in an opened position, FIG. 7 a cross section of a fail-safe-mechanism of the illumination device in FIG. 1.

FIG. 1 shows an illumination device 10 for a motor vehicle headlamp, wherein the illumination device 10 comprises a light module 20 configured to illuminate light along a light path in a main direction X, wherein the light module 20 is configured to illuminate a low and/or high beam light distribution in front of the illumination device 10.

Further, the illumination device 10 comprises a movable lower light guide element 100 and a movable upper light guide element 200 and a motion device for a movement of the lower and upper light guide element 100, 200 with respect to each other between a closed position P1, wherein the lower and upper light guide element 100, 200 are—as seen in the main direction X—in front of the at least one light module 20 at least partially blocking the light path of the at least one light module 20, wherein the lower and upper light guide element 100, 200 are configured to emit light in the main direction X, when in the closed position P1, and an opened position P2, wherein the lower and upper light guide element 100, 200 are moved away from the light path of the at least one light module to unblock the light path of the at least one light module 20, while maintaining their spatial orientation. In FIG. 1 the lower and upper light guide element 100, 200 are displayed in the closed position P1.

The light modules 20 are shown for example in FIG. 6, wherein in FIG. 6 the illumination device 10 is shown in a front view and in the opened position P2 so that the light modules 20 are visible.

Further, the illumination device 10 comprises a frame 600, which is stationary in relation to the movement of the lower and upper light guide element 100, 200, wherein the motion mechanism is mounted on the frame 600.

The motion device comprises a lower motion mechanism for a movement of the lower light guide element 100 between the closed and opened position P1, P2, said lower motion mechanism comprises a first lower motion element 310 with at least two bearing points, wherein the first lower motion element 310 is pivotably connected to the frame 600 via a fixed bearing point 310a and pivotably connected to the lower light guide element 100 via a floating bearing point 310b, wherein the floating bearing point 310b has a distance to the fixed bearing point 310a on the first lower motion element 310 and is movable along a circular path around a first rotation axis Y1 determined by the fixed bearing point 310a with a determined radius R1 given by the distance between the floating bearing point 310b to the fixed bearing point 310a.

FIG. 1 shows therefor the illumination device 10 in a closed position P1, wherein FIG. 4 corresponds to FIG. 1 and shows the illumination device 10 of FIG. 1 in the same view but in an opened position P2.

Further, the lower motion mechanism comprises a second lower motion element 320 with at least two bearing points, wherein the second lower motion element 320 is pivotably connected to the frame 600 via a fixed bearing point 320a and pivotably connected to the lower light guide element 100 via a floating bearing point 320b, wherein the floating bearing point 320b has a distance to the fixed bearing point 320a on the second lower motion element 320 and is movable along a circular path around a second rotation axis Y2 determined by the fixed bearing point 320a with a determined radius R1 given by the distance between the floating bearing point 320b to the fixed bearing point 320a.

The first and second rotation axis Y1, Y2 are orthogonal to the main direction X and are parallel to each other, which can be seen in FIG. 3, wherein distance of the floating bearing point 310b, 320b and the fixed bearing point 310a, 320a of the first and second lower motion element 310, 320 is the same.

The circular paths of the first and second lower motion elements 310, 320 are spatially separated, but are identical, so that the first and second lower motion element 310, 320 have the same deflection, and wherein the floating bearing points 310b, 320b of the first and second lower motion element 310, 320 are arranged and movable above the respective fixed bearing points 310a, 320a viewed in an installed position state of the illumination device 10 in a motor vehicle.

The first lower motion element 310 is mechanically engaged with a drive device 500 configured to move the first lower motion element 310, and wherein the first and second lower motion elements 310, 320 are connected via the lower light guide element 100 in a way, so that the first and second lower motion elements 310, 320 are movable by the same deflection about their respective fixed bearing point 310a, 320a when the first lower motion element 310 is moved by the drive device 500.

The drive device 500 comprises a motor 510 and a driving lever 520, wherein the driving lever 520 is mechanically connected to the motor 510 via a bearing point 530 and mechanically connected to the first lower motion element 310 via a bearing point 540, wherein the driving lever 520 is driven by the motor 510 in a way, so that the driving lever 520 causes a movement of the floating bearing point 310b of the first lower motion element 310 on the circular path around the first rotation axis Y1—as can be seen in more detail in FIG. 1.

Further, the first and second lower motion element 310, 320 are movable between a first deflection and a second deflection, causing the movement of the lower light guide element 100 between the closed and opened position P1, P2, while the lower light guide element 100 maintaining its spatial orientation due to the same radius R1 and deflection of the first and second lower motion elements 310, 320, wherein the lower light guide element 100 is in the closed position P1, when the first and second lower motion elements 310, 320 are aligned in the first deflection, and wherein the lower light guide element 100 is in the opened position P2, when the first and second lower motion element 310, 320 are aligned in the second deflection.

The illumination device 10 further comprises an upper motion mechanism to movement of the upper light guide element 200 between the closed and opened position P1, P2, said upper motion mechanism comprises a first upper motion element 410 with at least two bearing points, wherein the first upper transition element 410 is pivotably connected to the frame 600 via a fixed bearing point 410a and pivotably connected to the upper light guide element 200 via a floating bearing point 410b.

The floating bearing point 410b has a distance to the fixed bearing point 410a on the first upper motion element 410 and is movable along a circular path around a third rotation axis Y3 determined by the fixed bearing point 410a with a determined radius R2 given by the distance between the floating bearing point 410b to the fixed bearing point 410a.

The upper motion mechanism comprises further a second upper motion element 420 with at least two bearing points, wherein the second upper motion element 420 is pivotably connected to the frame 600 via a fixed bearing point 420a and pivotably connected to the upper light guide element 200 via a floating bearing point 420b, wherein the floating bearing point 420b has a distance to the fixed bearing point 420a on the second upper motion element 420 and is movable along a circular path around a fourth rotation axis Y4 determined by the fixed bearing point 420a with a determined radius R2 given by the distance between the floating bearing point 420b to the fixed bearing point 420a. The upper motion mechanism and its components can be seen in particular in FIG. 1.

The third and fourth rotation axis Y3, Y4 are parallel to each other and to the first and second rotation axis Y1, Y2, wherein the first and second upper motion element 410, 420 having the same radius R2, and wherein the circular paths of the first and second upper motion elements 410, 420 are spatially separated, but are congruent, so that the first and second upper motion element 410, 420 have the same deflection, and wherein the floating bearing points 410b, 420b of the first and second upper motion element 410, 420 are arranged and movable below the respective fixed bearing points 410a, 420a viewed in an installed state of the illumination device 10 in a motor vehicle.

The first upper motion element 410 is mechanically engaged with the second lower motion element 320 in a first transmission connection in a way, so that a rotational movement of the second lower motion element 320 around its fixed bearing point 320a is transformed into a rotational movement of the first upper motion element 410 around its fixed bearing point 410a with an opposite rotational direction.

The first and second upper motion element 410, 420 are connected via the upper light guide element 200 in a way, so that the first and second upper motion element 410, 420 are movable by the same deflection about their respective fixed bearing point 410a, 420a when the first upper motion element 410 is moved by the second lower motion element 320.

Further, the first and second upper motion element 410, 420 are movable between a third deflection and a fourth deflection, causing the motion of the upper light guide element 200 between the closed and opened position P1, P2, while the upper light guide element 200 maintaining its spatial orientation due to the same radius R2 and deflection of the first and second upper motion elements 410, 420, wherein the upper light guide element 200 is in the closed position P1, when the first and second upper motion elements 410, 420 are aligned in the third deflection, and wherein the upper light guide element 200 is in the opened position P2, when the first and second upper motion element 410, 420 are aligned in the fourth deflection.

The lower motion mechanism comprises a third lower motion element 330 with at least two bearing points, wherein the third lower motion element 330 is pivotably connected to the frame 600 via a fixed bearing point 330a and pivotably connected to the lower light guide element 100 via a floating bearing point 330b, wherein the floating bearing point 330b has a distance to the fixed bearing point 330a on the third lower motion element 330 and is movable along a circular path around a fifth rotation axis Y5 determined by the fixed bearing point 330a with a determined radius R1 given by the distance between the floating bearing point 330b to the fixed bearing point 330a.

The upper motion mechanism comprises further a third upper motion element 430 with at least two bearing points, wherein the third upper motion element 430 is pivotably connected to the frame 600 via a fixed bearing point 430a and pivotably connected to the upper light guide element 200 via a floating bearing point 430b, wherein the floating bearing point 430b has a distance to the fixed bearing point 430a on the third upper motion element 430 and is movable along a circular path around a sixth rotation axis Y6 determined by the fixed bearing point 430a with a determined radius R2 given by the distance between the floating bearing point 430b to the fixed bearing point 430a.

The third upper motion element 430 is mechanically engaged with the third lower motion element 330 in a second transmission connection in a way, so that a rotational movement of the third lower motion element 330 around its fixed bearing point 330a is transformed into a rotational movement of the third upper motion element 430 around its fixed bearing point 430a with an opposite rotational direction.

Further, the illumination device 10 has-viewed in the main direction X and in an installed state of the illumination device 10 in a motor vehicle-two opposite lateral sides, wherein on each lateral side only one transmission connection is disposed.

Moreover, the lower and upper motion mechanism causes that the lower and upper light guide elements 100, 200 when transition from the opened position P2 to closed position P1 follow a movement where the light guide elements 100, 200 move simultaneously to each other and against the main direction X. Thus, seen in a side view of the illumination device 10—in y-direction as indicated for example in FIGS. 4 and 5—the light guide elements perform a movement along a circular path, which is indicated in the figures as dotted lines.

When transitioning from the closed position P1 into the opened position P2, the light guide elements perform a movement opposite to the abovementioned movement.

In the shown example of the illumination device 10, the third upper motion element 430 and the third lower motion element 330 are built as gear wheels that are mechanically engaged with each other in order to transmit the movement of the third lower motion element 330 to the third upper motion element 430.

Also, the second lower motion element 320 and the first upper motion element 410 are built as gear wheels that are mechanically engaged with each other in order to transmit the movement of the second lower motion element 320 to the first upper motion element 410.

Further, the first and second upper motion elements 410, 420 are further connected via a rod 450, wherein the rod 450 comprises a bearing point pivotably connected to the first upper motion element 410 and a bearing point pivotably connected to the second upper motion element 420, wherein the rod 450 is configured to guide the second upper motion element 420 in its movement between the third and fourth deflection, when the first upper motion element 410 is moved by the second lower motion element 320—as can be seen in FIG. 1.

Moreover, the upper motion mechanism comprises a fourth upper motion element 440 with at least two bearing points, wherein the fourth upper motion element 440 is pivotably connected to the frame 600 via a fixed bearing point 440a and pivotably connected to the upper light guide element 200 via a floating bearing point 440b, wherein the floating bearing point 440b has a distance to the fixed bearing point 440a on the fourth upper motion element 440 and is movable along a circular path around a seventh rotation axis Y7 determined by the fixed bearing point 440a with a determined radius R2 given by the distance between the floating bearing point 440b to the fixed bearing point 440a, wherein the seventh rotation axis Y7 is parallel to the sixth rotation axis Y6.

The third and fourth upper motion element 430, 440 having the same radius R2, and wherein the circular paths of the third and fourth upper motion elements 430, 440 are spatially separated, but are congruent, so that the third and fourth upper motion element 430, 440 have the same deflection, and wherein the floating bearing points 430b, 440b of the third and fourth upper motion element 430, 440 are arranged and movable below the respective fixed bearing points 430a, 440a viewed in an installed state of the illumination device 10 in a motor vehicle.

The third and fourth upper motion elements 430, 440 are further connected via a rod 460, wherein the rod 460 comprises a bearing point pivotably connected to the third upper motion element 430 and a bearing point pivotably connected to the fourth upper motion element 440, wherein the rod 460 is configured to guide the fourth upper motion element 440 in its movement between the third and fourth deflection, when the third upper motion element 430 is moved by the third lower motion element 330—as can be seen for example in FIG. 2.

Further, FIG. 2 shows the illumination device 10 in a closed position P1, wherein FIG. 5 corresponds to FIG. 2 and shows the illumination device 10 of FIG. 2 in the same view but in an opened position P2.

The illumination device 10 also comprises a fail-safe-mechanism for manually move the upper and lower light guide element 100, 200 into the opened position P2, which is shown in FIG. 7, wherein the fail-safe-mechanism comprises a transmission element 700 comprising a thread portion 710 extending along a thread axis T, said transmission element 700 is rotatably mounted on the frame 600 around the thread axis T.

The fail-safe-mechanism further comprises a drive device holder 800 holding the drive device 500, wherein the drive device holder 800 comprises a counter-thread portion 810 corresponding to the thread portion 710 of the transmission element 700, wherein the drive device holder 800 is in mechanical engagement with the transmission element 700 by means of the counter-thread portion 810 and the thread portion 710.

The drive device holder 800 with the counter-thread portion 810 in combination with the thread portion 710 of the transmission element 700, in order to translate a rotational movement of the transmission element 700 into a linear movement, is configured to convert an angular movement of the transmission element 700 into a linear movement of the drive device 500 along the thread axis T, wherein the linear movement of the drive device 500 moves the first lower motion element 310 in order to move the lower and upper light guide element 100, 200 into the opened position P2.

LIST OF REFERENCE SIGNS

Illumination device . . . 10
Light module . . . 20
Lower light guide element . . . 100
Upper light guide element . . . 200
First lower motion element . . . 310
Fixed bearing point (1. Lower m.e.) . . . 310a
Floating bearing point (1. Lower m.e.) . . . 310b
Second lower motion element . . . 320
Fixed bearing point (2. Lower m.e.) . . . 320a
Floating bearing point (2. Lower m.e.) . . . 320b
Third lower motion element . . . 330
Fixed bearing point (3. Lower m.e.) . . . 330a
Floating bearing point (3. Lower m.e.) . . . 330b
First upper motion element . . . 410
Fixed bearing point (1. upper m.e.) . . . 410a
Floating bearing point (1. upper m.e.) . . . 410b
Second upper motion element . . . 420
Fixed bearing point (2. upper m.e.) . . . 420a
Floating bearing point (2. upper m.e.) . . . 420b
Third upper motion element . . . 430

Fixed bearing point (3. upper m.e.) . . . 430*a*
Floating bearing point (3. upper m.e.) . . . 430*b*
Fourth upper motion element . . . 440
Fixed bearing point (4. upper m.e.) . . . 440*a*
Floating bearing point (4. upper m.e.) . . . 440*b*
Rod . . . 450, 460
Drive device . . . 500
Motor . . . 510
Driving lever . . . 520
Bearing point (lever/motor) . . . 530
Bearing point (lever/1. Lower m.e.) . . . 540
Frame . . . 600
Transmission element . . . 700
Thread portion . . . 710
Drive device holder . . . 800
Counter-thread portion . . . 810
Closed position . . . P1
Opened position . . . P2
Radius . . . R1, R2
Thread axis . . . T
Main direction . . . x
First rotation axis . . . Y1
Second rotation axis . . . Y2
Third rotation axis . . . Y3
Fourth rotation axis . . . Y4
Fifth rotation axis . . . Y5
Sixth rotation axis . . . Y6
Seventh rotation axis . . . Y7

The invention claimed is:

1. An illumination device (10) for a motor vehicle headlamp, the illumination device (10) comprising:
   at least one light module (20) configured to illuminate light along a light path in a main direction (X);
   a movable lower light guide element (100) and a movable upper light guide element (200);
   a motion device for a movement of the lower and upper light guide element (100, 200) with respect to each other between
      a closed position (P1), wherein the lower and upper light guide element (100, 200) are—as seen in the main direction (X)—in front of the at least one light module (20) at least partially blocking the light path of the at least one light module (20), wherein the lower and upper light guide element (100, 200) are configured to emit light in the main direction (X), when in the closed position (P1), and
      an opened position (P2), wherein the lower and upper light guide element (100, 200) are moved away from the light path of the at least one light module to unblock the light path of the at least one light module (20),
   while maintaining their spatial orientation; and
   a frame (600), which is stationary in relation to the movement of the lower and upper light guide element (100, 200), wherein the motion mechanism is mounted on the frame (600),
   wherein the motion device comprises:
      a lower motion mechanism for a movement of the lower light guide element (100) between the closed and opened position (P1, P2), said lower motion mechanism comprises:
         a first lower motion element (310) with at least two bearing points, wherein the first lower motion element (310) is pivotably connected to the frame (600) via a fixed bearing point (310*a*) and pivotably connected to the lower light guide element (100) via a floating bearing point (310*b*), wherein the floating bearing point (310*b*) has a distance to the fixed bearing point (310*a*) on the first lower motion element (310) and is movable along a circular path around a first rotation axis (Y1) determined by the fixed bearing point (310*a*) with a determined radius (R1) given by the distance between the floating bearing point (310*b*) to the fixed bearing point (310*a*), and
         a second lower motion element (320) with at least two bearing points, wherein the second lower motion element (320) is pivotably connected to the frame (600) via a fixed bearing point (320*a*) and pivotably connected to the lower light guide element (100) via a floating bearing point (320*b*), wherein the floating bearing point (320*b*) has a distance to the fixed bearing point (320*a*) on the second lower motion element (320) and is movable along a circular path around a second rotation axis (Y2) determined by the fixed bearing point (320*a*) with a determined radius (R1) given by the distance between the floating bearing point (320*b*) to the fixed bearing point (320*a*),
      wherein the first and second rotation axis (Y1, Y2) are orthogonal to the main direction (X) and are parallel to each other, wherein distance of the floating bearing point (310*b*, 320*b*) and the fixed bearing point (310*a*, 320*a*) of the first and second lower motion element (310, 320) is the same, and wherein the circular paths of the first and second lower motion elements (310, 320) are spatially separated, but are identical, so that the first and second lower motion element (310, 320) have the same deflection, and wherein the floating bearing points (310*b*, 320*b*) of the first and second lower motion element (310, 320) are arranged and movable above the respective fixed bearing points (310*a*, 320*a*) viewed in an installed state of the illumination device (10) in a motor vehicle,
      wherein the first lower motion element (310) is mechanically engaged with a drive device (500) configured to move the first lower motion element (310), and wherein the first and second lower motion elements (310, 320) are connected via the lower light guide element (100) in a way, so that the first and second lower motion elements (310, 320) are movable by the same deflection about their respective fixed bearing point (310*a*, 320*a*) when the first lower motion element (310) is moved by the drive device (500), and
      wherein the first and second lower motion element (310, 320) are movable between a first deflection and a second deflection, causing the movement of the lower light guide element (100) between the closed and opened position (P1, P2), while the lower light guide element (100) maintaining its spatial orientation due to the same radius (R1) and deflection of the first and second lower motion elements (310, 320), wherein the lower light guide element (100) is in the closed position (P1), when the first and second lower motion elements (310, 320) are aligned in the first deflection, and wherein the lower light guide element (100) is in the opened position (P2), when the first and second lower motion element (310, 320) are aligned in the second deflection, an upper motion mechanism to movement of the upper light guide element (200) between the closed and opened position (P1, P2), wherein said upper motion mechanism comprises:
- a first upper motion element (410) with at least two bearing points, wherein the first upper transition element (410) is pivotably connected to the frame (600) via a fixed bearing point (410*a*) and pivotably connected to the upper light guide element (200) via a floating bearing point (410*b*), wherein the floating bearing point (410*b*) has a distance to the fixed bearing point (410*a*) on the first upper motion element (410) and is movable along a circular path around a third rotation axis (Y3) determined by the fixed bearing point (410*a*) with a determined radius (R2) given by the distance between the floating bearing point (410*b*) to the fixed bearing point (410*a*), and
- a second upper motion element (420) with at least two bearing points, wherein the second upper motion element (420) is pivotably connected to the frame (600) via a fixed bearing point (420*a*) and pivotably connected to the upper light guide element (200) via a floating bearing point (420*b*), wherein the floating bearing point (420*b*) has a distance to the fixed bearing point (420*a*) on the second upper motion element (420) and is movable along a circular path around a fourth rotation axis (Y4) determined by the fixed bearing point (420*a*) with a determined radius (R2) given by the distance between the floating bearing point (420*b*) to the fixed bearing point (420*a*), and wherein the third and fourth rotation axis (Y3, Y4) are parallel to each other and to the first and second rotation axis (Y1, Y2), wherein the first and second upper motion element (410, 420) having the same radius (R2), and wherein the circular paths of the first and second upper motion elements (410, 420) are spatially separated, but are congruent, so that the first and second upper motion element (410, 420) have the same deflection, and wherein the floating bearing points (410*b*, 420*b*) of the first and second upper motion element (410, 420) are arranged and movable below the respective fixed bearing points (410*a*, 420*a*) viewed in an installed state of the illumination device (10) in a motor vehicle, wherein the first upper motion element (410) is mechanically engaged with the second lower motion element (320) in a first transmission connection in a way, so that a rotational movement of the second lower motion element (320) around its fixed bearing point (320*a*) is transformed into a rotational movement of the first upper motion element (410) around its fixed bearing point (410*a*) with an opposite rotational direction, wherein the first and second upper motion element (410, 420) are connected via the upper light guide element (200) in a way, so that the first and second upper motion element (410, 420) are movable by the same deflection about their respective fixed bearing point (410*a*, 420*a*) when the first upper motion element (410) is moved by the second lower motion element (320), wherein the first and second upper motion element (410, 420) are movable between a third deflection and a fourth deflection, causing the motion of the upper light guide element (200) between the closed and opened position (P1, P2), while the upper light guide element (200) maintaining its spatial orientation due to the same radius (R2) and deflection of the first and second upper motion elements (410, 420), wherein the upper light guide element (200) is in the closed position (P1), when the first and second upper motion elements (410, 420) are aligned in the third deflection, and wherein the upper light guide element (200) is in the opened position (P2), when the first and second upper motion element (410, 420) are aligned in the fourth deflection, wherein the lower motion mechanism comprises a third lower motion element (330) with at least two bearing points, wherein the third lower motion element (330) is pivotably connected to the frame (600) via a fixed bearing point (330*a*) and pivotably connected to the lower light guide element (100) via a floating bearing point (330*b*), wherein the floating bearing point (330*b*) has a distance to the fixed bearing point (330*a*) on the third lower motion element (330) and is movable along a circular path around a fifth rotation axis (Y5) determined by the fixed bearing point (330*a*) with a determined radius (R1) given by the distance between the floating bearing point (330*b*) to the fixed bearing point (330*a*), wherein the upper motion mechanism comprises a third upper motion element (430) with at least two bearing points, wherein the third upper motion element (430) is pivotably connected to the frame (600) via a fixed bearing point (430*a*) and pivotably connected to the upper light guide element (200) via a floating bearing point (430*b*), wherein the floating bearing point (430*b*) has a distance to the fixed bearing point (430*a*) on the third upper motion element (430) and is movable along a circular path around a sixth rotation axis (Y6) determined by the fixed bearing point (430*a*) with a determined radius (R2) given by the distance between the floating bearing point (430*b*) to the fixed bearing point (430*a*), wherein the third upper motion element (430) is mechanically engaged with the third lower motion element (330) in a second transmission connection in a way, so that a rotational movement of the third lower motion element (330) around its fixed bearing point (330*a*) is transformed into a rotational movement of the third upper motion element (430) around its fixed bearing point (430*a*) with an opposite rotational direction, and wherein the illumination device has—viewed in the main direction (X) and in an installed state of the illumination device (10) in a motor vehicle—two opposite lateral sides, wherein on each lateral side only one transmission connection is disposed.

2. The illumination device (10) according to claim 1, wherein the third upper motion element (430) and the third lower motion element (330) are built as gear wheels that are mechanically engaged with each other in order to transmit the movement of the third lower motion element (330) to the third upper motion element (430).

3. The illumination device (10) according to claim 1, wherein the second lower motion element (320) and the first upper motion element (410) are built as gear wheels that are mechanically engaged with each other in order to transmit the movement of the second lower motion element (320) to the first upper motion element (410).

4. The illumination device (10) according to of claim 1, wherein the drive device (500) is a linear driving device.

5. The illumination device (10) according to claim 1, wherein the drive device comprises a motor (510) and a driving lever (520), wherein the driving lever (520) is mechanically connected to the motor (510) via a bearing point (530) and mechanically connected to the first lower motion element (310) via a bearing point (540), wherein the driving lever (520) is driven by the motor (510) in a way, so that the driving lever (520) causes a movement of the floating bearing point (310b) of the first lower motion element (310) on the circular path around the first rotation axis (Y1).

6. The illumination device (10) according to claim 1, wherein the first and second upper motion elements (410, 420) are further connected via a rod (450), wherein the rod (450) comprises a bearing point pivotably connected to the first upper motion element (410) and a bearing point pivotably connected to the second upper motion element (420), wherein the rod (450) is configured to guide the second upper motion element (420) in its movement between the third and fourth deflection, when the first upper motion element (410) is moved by the second lower motion element (320).

7. The illumination device (10) according to claim 1, wherein the upper motion mechanism comprises a fourth upper motion element (440) with at least two bearing points, wherein the fourth upper motion element (440) is pivotably connected to the frame (600) via a fixed bearing point (440a) and pivotably connected to the upper light guide element (200) via a floating bearing point (440b), wherein the floating bearing point (440b) has a distance to the fixed bearing point (440a) on the fourth upper motion element (440) and is movable along a circular path around a seventh rotation axis (Y7) determined by the fixed bearing point (440a) with a determined radius (R2) given by the distance between the floating bearing point (440b) to the fixed bearing point (440a), wherein the seventh rotation axis (Y7) is parallel to the sixth rotation axis (Y6), and wherein:

the third and fourth upper motion element (430, 440) have the same radius (R2), and wherein the circular paths of the third and fourth upper motion elements (430, 440) are spatially separated, but are congruent, so that the third and fourth upper motion element (430, 440) have the same deflection, and wherein the floating bearing points (430b, 440b) of the third and fourth upper motion element (430, 440) are arranged and movable below the respective fixed bearing points (430a, 440a) viewed in an installed state of the illumination device (10) in a motor vehicle, and the third and fourth upper motion elements (430, 440) are further connected via a rod (460), wherein the rod (460) comprises a bearing point pivotably connected to the third upper motion element (430) and a bearing point pivotably connected to the fourth upper motion element (440), wherein the rod (460) is configured to guide the fourth upper motion element (440) in its movement between the third and fourth deflection, when the third upper motion element (430) is moved by the third lower motion element (330).

8. The illumination device (10) according to claim 1, wherein the illumination device (10) comprises a fail-safe-mechanism for manually move the upper and lower light guide element (100, 200) into the opened position (P2), wherein the fail-safe-mechanism comprises:

a transmission element (700) comprising a thread portion (710) extending along a thread axis (T), wherein said transmission element (700) is rotatably mounted on the frame (600) around the thread axis (T), and a drive device holder (800) holding the drive device (500), wherein the drive device holder (800) comprises a counter-thread portion (810) corresponding to the thread portion (710) of the transmission element (700), wherein the drive device holder (800) is in mechanical engagement with the transmission element (700) by means of the counter-thread portion (810) and the thread portion (710), wherein the drive device holder (800) with the counter-thread portion (810) in combination with the thread portion (710) of the transmission element (700), in order to translate a rotational movement of the transmission element (700) into a linear movement, is configured to convert an angular movement of the transmission element (700) into a linear movement of the drive device (500) along the thread axis (T), and wherein the linear movement of the drive device (500) moves the first lower motion element (310) in order to move the lower and upper light guide element (100, 200) into the opened position (P2).

9. A motor vehicle headlamp comprising at least one illumination device (10) according to claim 1.

* * * * *